United States Patent
Abrishamchian et al.

(10) Patent No.: US 9,275,667 B1
(45) Date of Patent: Mar. 1, 2016

(54) DISK DRIVE SERVO CONTROL SYSTEM WITH LOW POWER CONSUMPTION FOR LONG SEEKS

(71) Applicant: HGST Netherlands B.V., Amsterdam (NL)

(72) Inventors: MirMehdi L. Abrishamchian, Pleasanton, CA (US); Fred Feng Hong, San Jose, CA (US); Peyman Niazi, Pleasanton, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/602,352

(22) Filed: Jan. 22, 2015

(51) Int. Cl.
*G11B 5/596* (2006.01)

(52) U.S. Cl.
CPC ....................................... *G11B 5/596* (2013.01)

(58) Field of Classification Search
None
See application file for complete search history.

(56) References Cited

U.S. PATENT DOCUMENTS

| | | | |
|---|---|---|---|
| 6,038,096 A | 3/2000 | Zhang | |
| 6,178,060 B1 | 1/2001 | Liu | |
| 6,445,531 B1 * | 9/2002 | Gaertner et al. | 360/78.06 |
| 6,809,896 B2 | 10/2004 | Espeseth et al. | |
| 7,199,966 B1 * | 4/2007 | Tu et al. | 360/78.06 |
| 7,486,471 B2 | 2/2009 | DeRosa | |
| 7,580,219 B2 | 8/2009 | DeRosa et al. | |
| 7,602,581 B2 | 10/2009 | Heise et al. | |
| 8,364,992 B2 | 1/2013 | Guthrie et al. | |
| 8,797,675 B2 | 8/2014 | Birtzer et al. | |
| 8,902,539 B1 * | 12/2014 | Liu et al. | 360/78.06 |

* cited by examiner

*Primary Examiner* — K. Wong
(74) *Attorney, Agent, or Firm* — Thomas R. Berthold

(57) ABSTRACT

A disk drive has a servo control system that implements just-in-time (JIT) seeks with low power consumption for all long seeks. The servo controller receives a seek command to move the transducer to a target data track and sector, calculates rotational latency from the seek command, and limits the transducer velocity for seeks longer than a predetermined seek length. The servo controller then generates a JIT gain from the calculated rotational latency, modifies the transducer acceleration and deceleration using the JIT gain, and modifies the transducer velocity limit using the JIT gain. Positive current is applied to the actuator to move the transducer with the JIT gain-modified acceleration until the transducer reaches the modified velocity limit. The servo controller determines when to initiate deceleration of the transducer, and applies negative current to the actuator to move the transducer with the JIT gain-modified deceleration until the transducer reaches the target track.

10 Claims, 10 Drawing Sheets

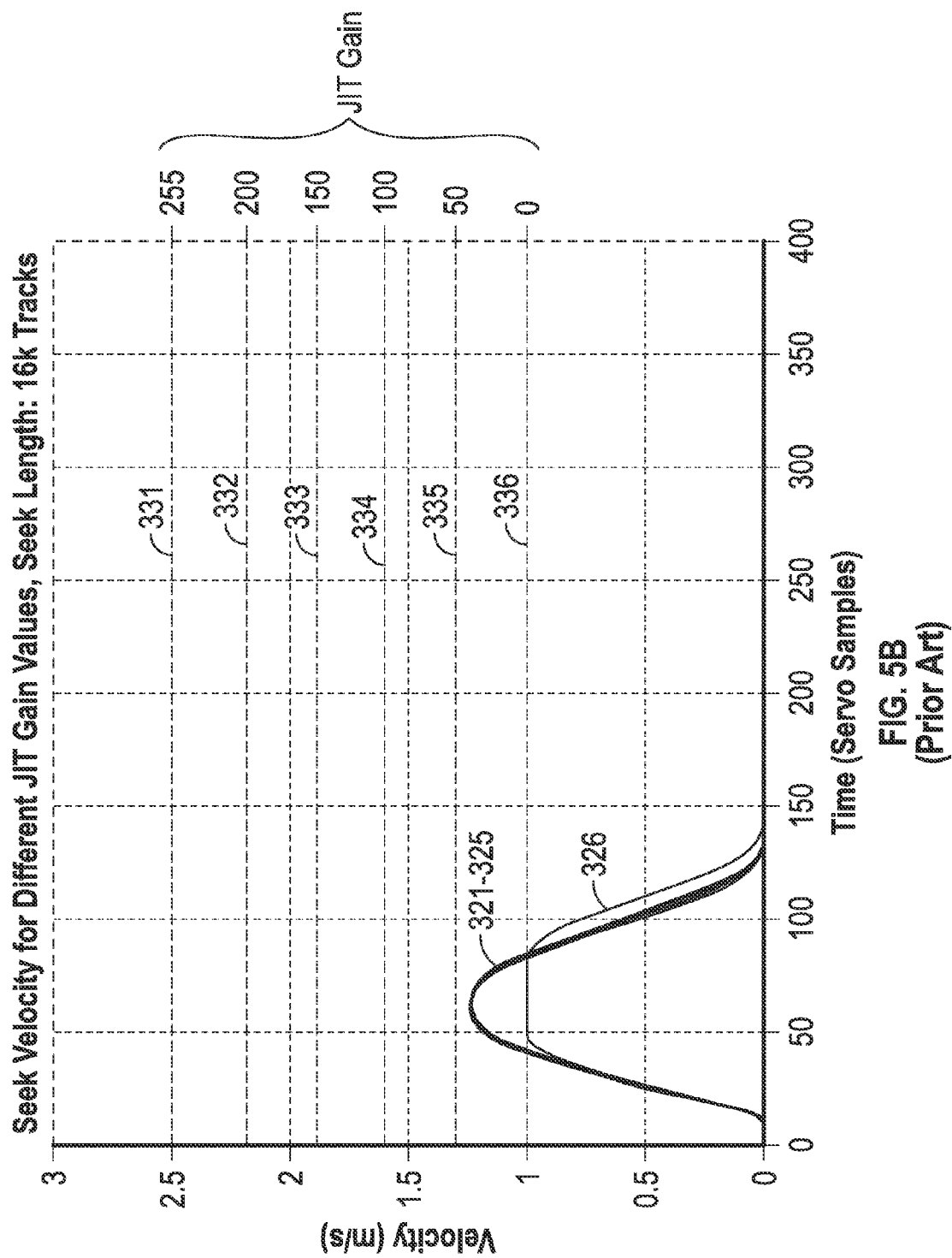

DISK DRIVE SERVO CONTROL SYSTEM WITH LOW POWER CONSUMPTION FOR LONG SEEKS

BACKGROUND OF THE INVENTION

1. Field of the Invention

This invention relates generally to hard disk drives (HDDs) and more particularly to an HDD with a servo control system that is capable of performing "just-in-time" (JIT) seeks of the read/write transducer to a target data track.

2. Description of the Related Art

Disk drives are digital data storage devices that allow host computer systems to store and retrieve large amounts of data in a fast and efficient manner. A typical disk drive includes one or more magnetic recording disks that are mounted to a rotatable hub of a spindle motor and rotated at a high speed. An array of read/write transducers is disposed adjacent to surfaces of the disks to transfer data between the disks and a host computer. The transducers are radially positioned over the disks by a rotary actuator and a closed loop servo control system.

Each disk surface has a plurality of concentric data tracks. A preamplifier/write driver circuit generates write currents to the transducer to selectively magnetize the tracks during a data write operation, and amplifies read signals generated by the transducer from the selective magnetization of the tracks during a data read operation. A read/write channel and interface circuit are connected to the preamplifier/write driver circuit to transfer the data between the disks and the host computer.

The servo system can operate in two primary modes: seeking and track following. During a seek, a selected transducer is moved from an initial track to a target track on the corresponding disk surface. The servo system applies current to an actuator to first accelerate and then decelerate the transducer toward the target track. As the transducer approaches the target track, the servo system initiates a settle mode to bring the transducer to rest over the target track within a selected settle threshold, such as a percentage of the track width from track center. Thereafter, the servo system enters the track following mode wherein the transducer is nominally maintained over the center of the target track until another seek is performed.

In early disk drives the actuator operated at full power and moved the transducer with maximum allowable velocity to minimize the seek time for all seek lengths. Once the seek is completed and the transducer reaches the target track, additional time is required to rotate the disk until the target sector is beneath the transducer. This additional time is referred to as rotational latency. More recently, a "just-in-time" (JIT) seek method was implemented. With the JIT method, the actuator takes advantage of the rotational latency so that the transducer arrives at the target track just before the target sector has rotated to below the transducer. This increases the seek time but minimizes power consumption.

To implement the JIT method, the servo system clips or limits the transducer velocity, based on the value of rotational latency. Thus a JIT seek is a seek with a limited velocity lower than the maximum allowable velocity. One problem with this JIT method is that it may not affect all long seeks (seeks longer than some predetermined number of tracks), since some long seeks may already have a maximum velocity less than the limited velocity. Therefore, JIT does not affect those seeks. Power is not saved on seeks which are not affected by a reduction of the maximum velocity.

What is needed is a HDD with a servo control system with an improved JIT method that minimizes power for all long seeks.

SUMMARY OF THE INVENTION

Embodiments of the invention relate to a disk drive with a servo control system that implements just-in-time (JIT) seeks with low power consumption for all long seeks greater than a predetermined seek length. The servo controller receives a seek command to move the read/write transducer to a target data track and sector, calculates rotational latency from the seek command, and limits the transducer velocity for seeks longer than a predetermined seek length. The servo controller then generates a JIT gain from the calculated rotational latency, modifies the transducer acceleration and deceleration using the JIT gain, and modifies the transducer velocity limit using the JIT gain. Positive current is then applied to the actuator to move the transducer with the JIT gain-modified acceleration until the transducer reaches the modified velocity limit. The servo controller determines when to initiate deceleration of the transducer, and applies negative current to the actuator to move the transducer with the JIT gain-modified deceleration until the transducer reaches the target track.

For a fuller understanding of the nature and advantages of the present invention, reference should be made to the following detailed description taken together with the accompanying figures.

BRIEF DESCRIPTION OF THE DRAWING

FIG. 5B is a graph of transducer velocities as a function of time for various values of JIT gain for a seek length of 16K tracks using the prior art JIT method.

DETAILED DESCRIPTION OF THE INVENTION

Figure 1:
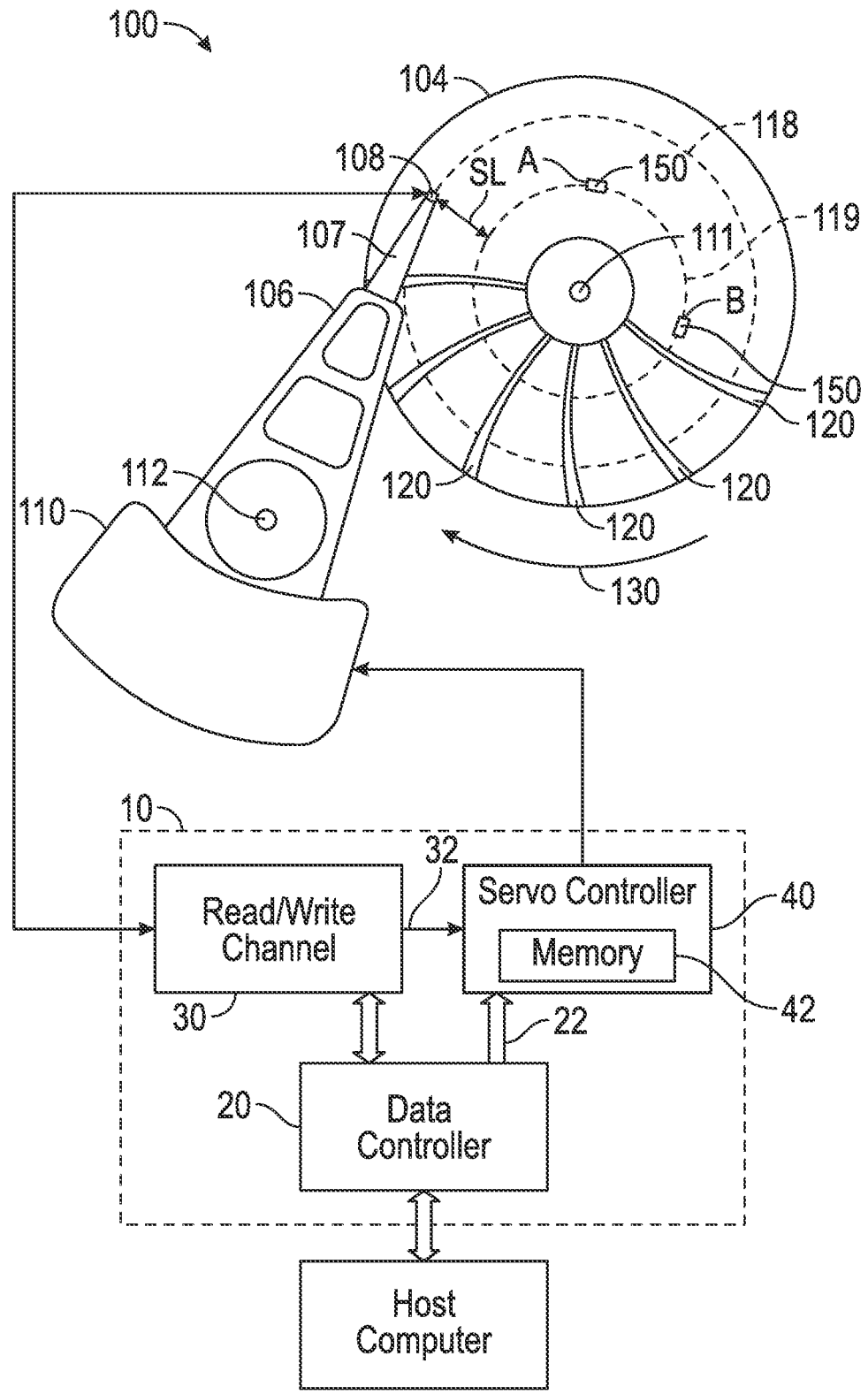
FIG. 1 is a block diagram of a disk drive for explaining the servo control system for performing the prior art "just-in-time" (JIT) seek method as well as the improved JIT method according to embodiments of the invention.

FIG. 1 is a block diagram of a disk drive illustrating the drive electronics 10 and the head-disk assembly (HDA) 100. FIG. 1 will be used to explain the servo control system for performing the prior art just-in-time (JIT) seek method as well as the improved JIT method according to embodiments of the invention. The HDA 100 includes a disk 104 and a voice coil motor (VCM) rotary actuator 110. The disk 104 has data tracks, like typical tracks 118, 119 that contain data sectors, and rotates about axis 111 in the direction shown by arrow 130. The actuator 110 pivots about axis 112 and includes an arm 106 and suspension 107 that supports the read/write head or transducer 108. The drive electronics 10 includes a data controller 20, a read/write channel 30, and a servo controller 40 with associated memory 42. Data is transferred between the host computer and the data controller 20. The data controller 20 formats the data into blocks with the appropriate header information and transfers the digital data to the read/write channel 30. The read/write channel 30 converts data between the digital form used by the data controller 20 and the analog form used by the read/write transducer 108. The read/write channel 30 also provides servo position information read from the disk 104 to the servo controller 40 on line 32. A plurality of regularly spaced servo sectors 120, only a representative few of which are shown in FIG. 1, extend generally radially across the data tracks. The servo sectors 120 provide transducer position information such as a track identification field and sector address, for identifying the track and data sector, and burst fields that provide fine position information. The transducer position information is used to detect the position of the transducer 108 in relation to the track and data sector within the track. The transducer position information from the servo sectors 120 is converted from analog signals to digital data in the read/write channel 30, and transferred to the servo controller 40 on line 32. The servo controller 40 uses the transducer position information to perform seeking and tracking operations of the transducer 108 over the data tracks of disk 104.

The data controller 20 also provides data that identifies the target track location and the addressed data sector on line 22 to the servo controller 40. The movement of the transducer 108 from an initial track, such as track 118, to a target track, such as track 119 is referred to as a "seek", the distance or number of tracks between the initial track and the target tracks is referred to as the "seek length" (SL), and the time to perform the seek is referred to as the "seek time." The servo controller 40 generates a current command that is converted into the actuator input current, and provided to the actuator 110 to move the transducer 108 across the disk 104. The seek time is thereby dependent on the magnitude of the current command.

Once the transducer 108 has reached the target track, the time required to rotate the disk 104 to a desired sector to perform a particular read or write operation is referred to as rotational "latency". The rotational latency can be as great as the time required for one revolution of the disk 104. For example, in FIG. 1 the transducer 108 is on track 118 and if it is desired to read data in sector 150 on track 119, the actuator 110 will initiate a seek to track 119, which will take a certain seek time. During this time the disk 104 will have rotated sector 150 from position A to position B. The additional time for the disk 104 to rotate sector 150 from position B to beneath transducer 108 on track 119 is the rotational latency. Generally, the total time to access an addressed data sector on the disk 104 is about equal to the sum of the seek time, the rotational latency, and the time required to read or write the data.

In all disk drives the mechanical and electrical design of the actuator and servo controller determines a maximum allowable velocity (Vmax) and a minimum allowable velocity (Vmin) for the transducer during a seek. In early disk drives the actuator operated at full power and moved the transducer with maximum allowable velocity to minimize the seek time for all seek lengths. More recently, a "just-in-time" (JIT) seek method was implemented. With JIT, the actuator takes advantage of the latency so that the transducer arrives at the target track just before the desired sector has rotated to below the transducer. This increases the seek time but minimizes power consumption.

To implement the JIT method, the servo controller uses Vmax as a "knob" to control the seek power, based on the value of rotational latency, by clipping the velocity. Thus a JIT seek is a seek with a limited velocity (Vlim) lower than Vmax. A full JIT seek is a seek with the minimum allowable velocity (Vmin). One problem with this method is that it may not affect all long seeks (seeks longer than some predetermined number of tracks), since some long seeks may already have a maximum velocity less than Vlim, the JIT velocity. Therefore, JIT does not affect those seeks. Power is not saved on seeks which are not affected by a reduction of maximum velocity.

The secondary issue with the current JIT method is that the seek cannot be slowed down monotonically for long seeks with low designed Vmax. In other words, the trade-off between latency and seek time is not predictable. That means that JIT may not be used for those seeks since it may cause missing the target and losing the performance. Therefore the opportunity to save more power is lost.

Figure 2:
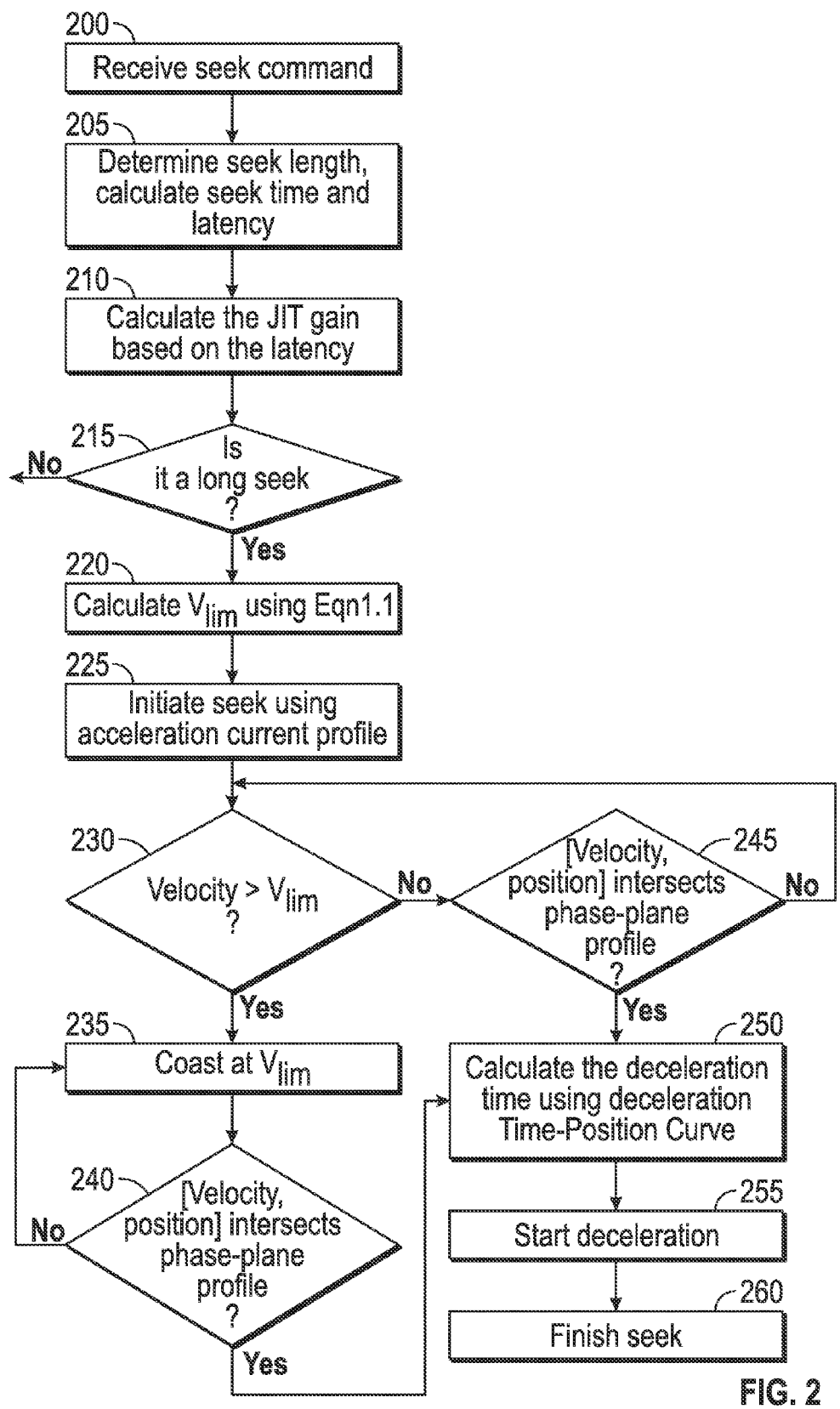
FIG. 2 is a flow chart of the prior art JIT method for long seeks, i.e., seek lengths greater than some predetermined value, for example 15K tracks.

FIG. 2 is a flow chart of the prior art JIT method for long seeks, i.e., seek lengths greater than some predetermined value, for example 15K tracks. The servo controller receives a seek command to a target data track and data sector (block 200) and calculates seek length, the minimum seek time, and rotational latency (block 205). In block 210, the servo controller calculates the JIT gain from the calculated rotational latency. The JIT gain is a number inversely linearly proportional to rotational latency. For example, the rotational latency may vary from 0 disk revolutions to 1 disk revolution, corresponding to JIT gain values from 255 to 0. In decision block 215, the seek length is greater than some predetermined value, for example 15K tracks. At block 220, the servo controller calculates the clipped or limited velocity (Vlim) according to the following equation:

$$Vlim = ((Vmax - Vmin)/JITGainMax)*JITGain + Vmin \quad \text{Eq. 1.1}$$

where JITGainMax is the maximum value of JITGain, in this example 255.

Figure 3:
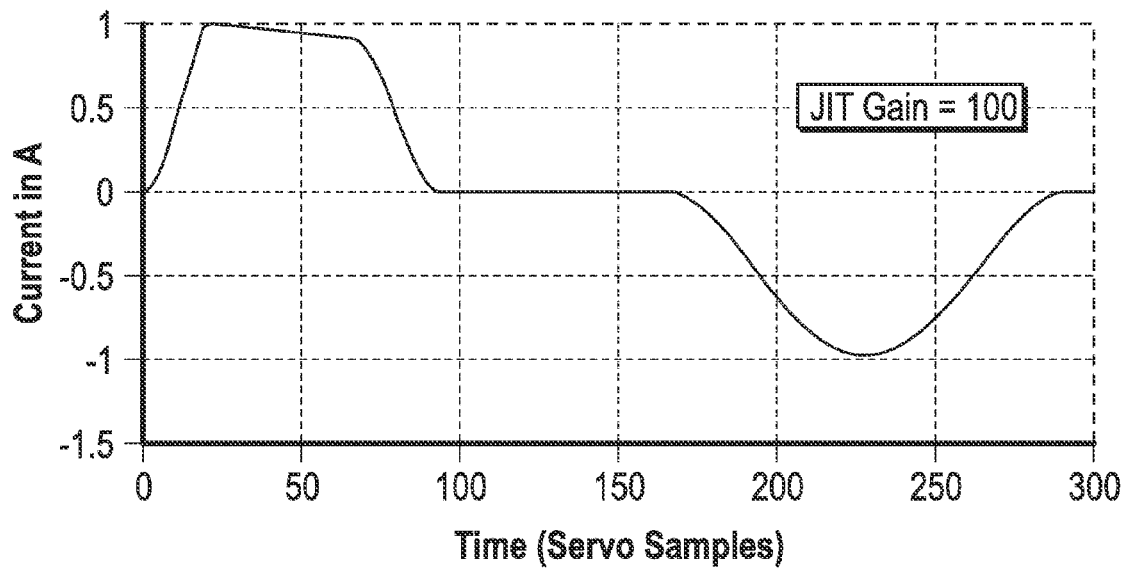
FIG. 3 is a graph of actuator current as a function of time (measured in number of servo sector samples) for a long seek with a JIT gain of 100 according to the prior art.

Then at block 225, the seek is initiated by use of a predetermined acceleration current profile. At decision block 230, the velocity of the transducer is compared to Vlim as the seek progresses. As the velocity increases, it may exceed Vlim, at which point the actuator current is reduced to zero and the transducer "coasts" with velocity Vlim (block 235). FIG. 3 is a graph of actuator current as a function of time (measured in number of servo sector samples) for a long seek with a JIT gain of 100. The acceleration current profile is applied between samples 0 to about 90, where the actuator current is positive. Between samples 90 to about 175, the actuator current is 0 and the transducer is coasting at Vlim.

Figure 4:
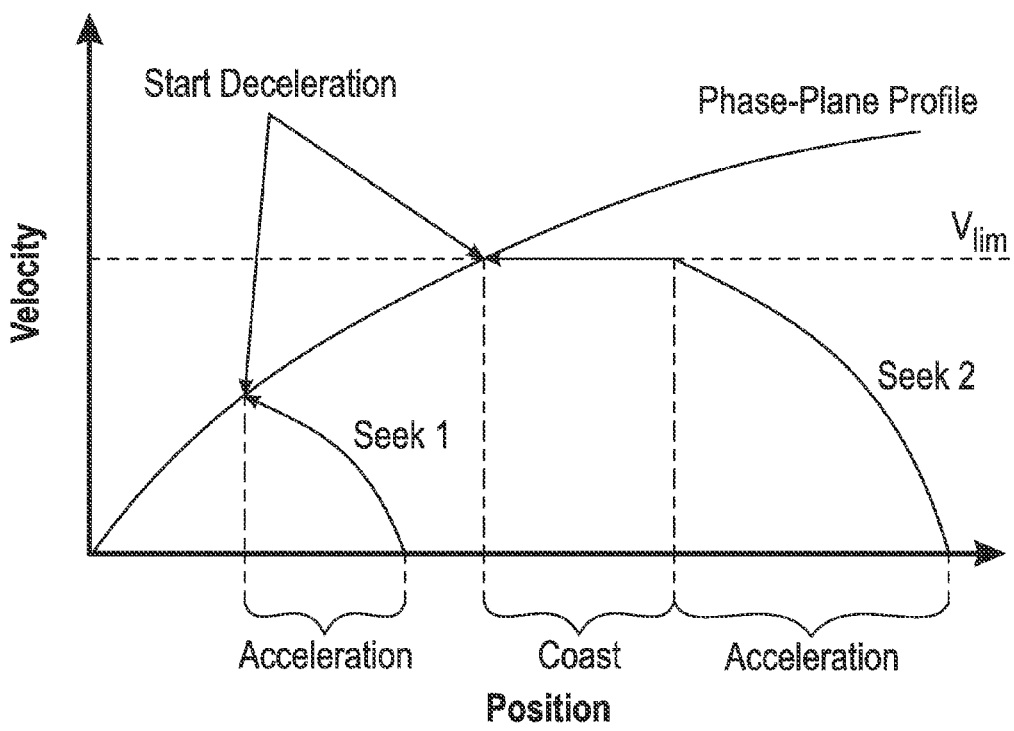
FIG. 4 is a graph showing the change in transducer position and velocity until the position and velocity intersect the Phase-Plane Profile for two different seeks, one of which has a velocity limit, for the JIT method according to the prior art.

At block 240 or 245, during the seek the position and velocity of the transducer are compared to a predetermined velocity-position phase-plane curve (Phase-Plane Profile). FIG. 4 is an example showing the change in transducer position and velocity until the position and velocity intersect the Phase-Plane Profile for two different seeks, one of which has a velocity limit. When the actual position and velocity intersects the Phase-Plane Profile, this indicates the start of deceleration (the application of negative actuator current). The deceleration time is calculated using the position and a predetermined deceleration Time-Position Curve (block 250). Referring to FIG. 3, the deceleration time is between samples 175 to about 290 where the actuator current is negative. The deceleration is initiated (block 255) and continues until the target track is reached (block 260).

Figure 5A:
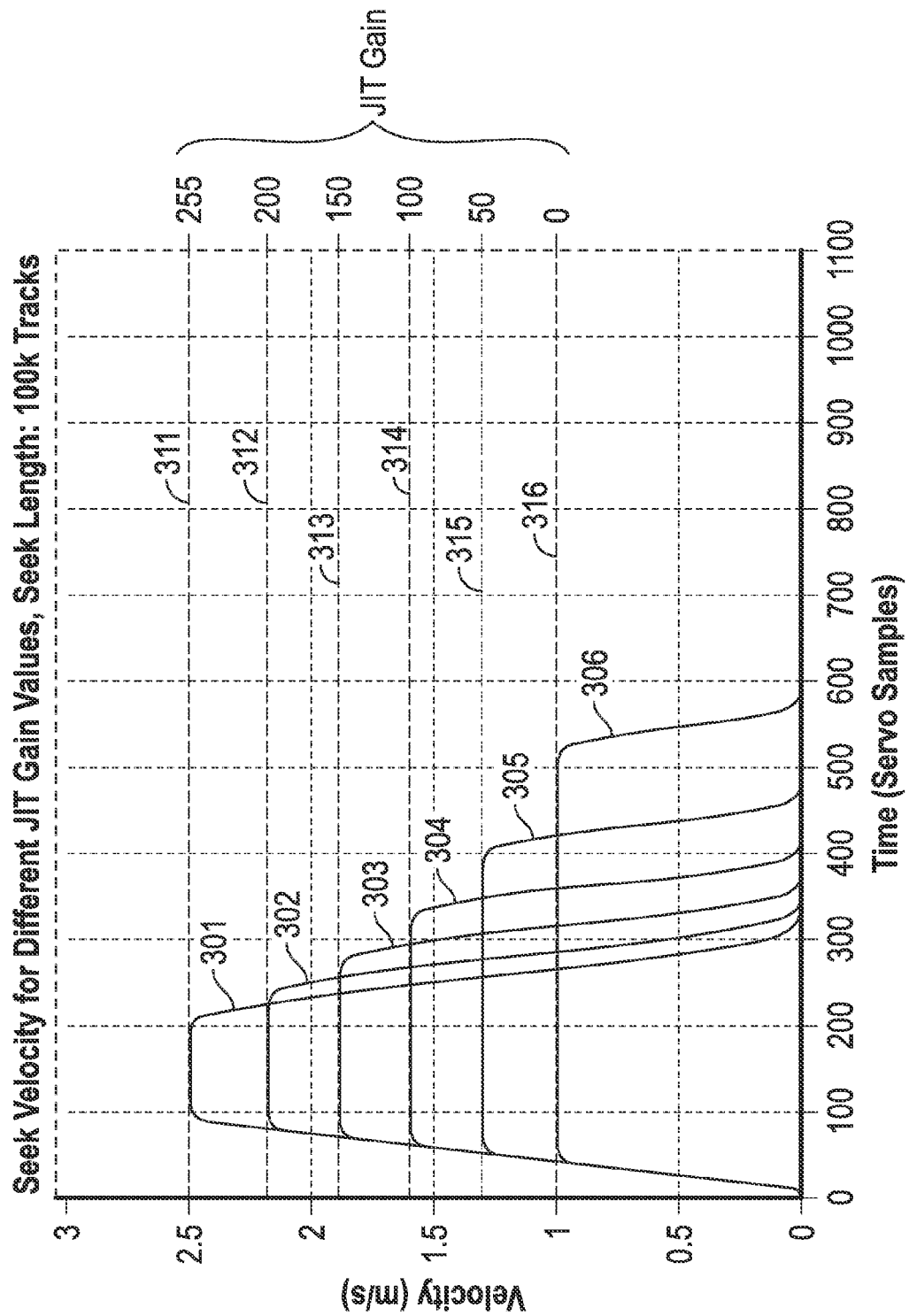
FIG. 5A is a graph of transducer velocities as a function of time for various values of JIT gain for a seek length of 100K tracks using the prior art JIT method.

FIG. 5A is a graph of transducer velocities as a function of time for various values of JIT gain for a seek length of 100K tracks using the prior art JIT method. The solid lines 301-306 are the seek velocity profiles and the corresponding dashed lines 311-316 are the corresponding values of Vlim calculated from Eq. 1.1. In this example Vlim is changed from 2.5 m/s to 1.0 m/s as JIT gain is changed from 255 to 0.

FIG. 5B is a graph like FIG. 5A but for a seek length of only 16K tracks. The solid lines 321-326 are the seek velocity profiles and the corresponding dashed lines 331-336 are the corresponding values of Vlim calculated from Eq. 1.1. For JIT gains from 255 to 50 there is no change in seek velocity (all the curves 321-325 are on top of one another). This is because the maximum velocity that can be achieved during these seeks without any JIT is about 1.2 m/s so lowering the velocity from 2.5 m/s 1.2 m/s has no effect on this seek length. So in this example only JIT gain values less than 50 will result in a clipping of the maximum velocity to Vlim. FIG. 5B thus illustrates the problem with the prior art JIT method. For certain long seeks, the seek time is not increased and the maximum seek velocity is not lowered so there is no power saving.

In embodiments of the improved JIT method of this invention, for all long seeks the acceleration current and deceleration current are reshaped and expanded in the time domain. A JIT gain-related acceleration gain (AccelGain) is used to modify the acceleration current profile. A JIT gain-related phase-plane gain (Phase-Plane Profile Scalar) is used to modify the Phase-Plane Profile. The Vlim is calculated from Phase-Plane Profile Scalar and Vmax and results in lower values of Vlim. A deceleration gain (DecelGain) is the inverse of Phase-Plane Profile Scalar and is used to modify the deceleration Time-Position Curve. Embodiments of the invention are implemented in the servo controller and associated memory. The operation of embodiments of this invention as described below may be implemented as a set of computer program instructions stored in machine-readable memory and executable by a processor, such as the servo controller, or by a dedicated microprocessor. The computer program instructions include the calculations and method steps described below. The servo controller or processor is configured to read and execute the program instructions. The servo controller or processor may perform logical and arithmetic operations based on program instructions stored in memory, and/or the calculations and functions of the method described below may be performed by hardware.

Figure 6:
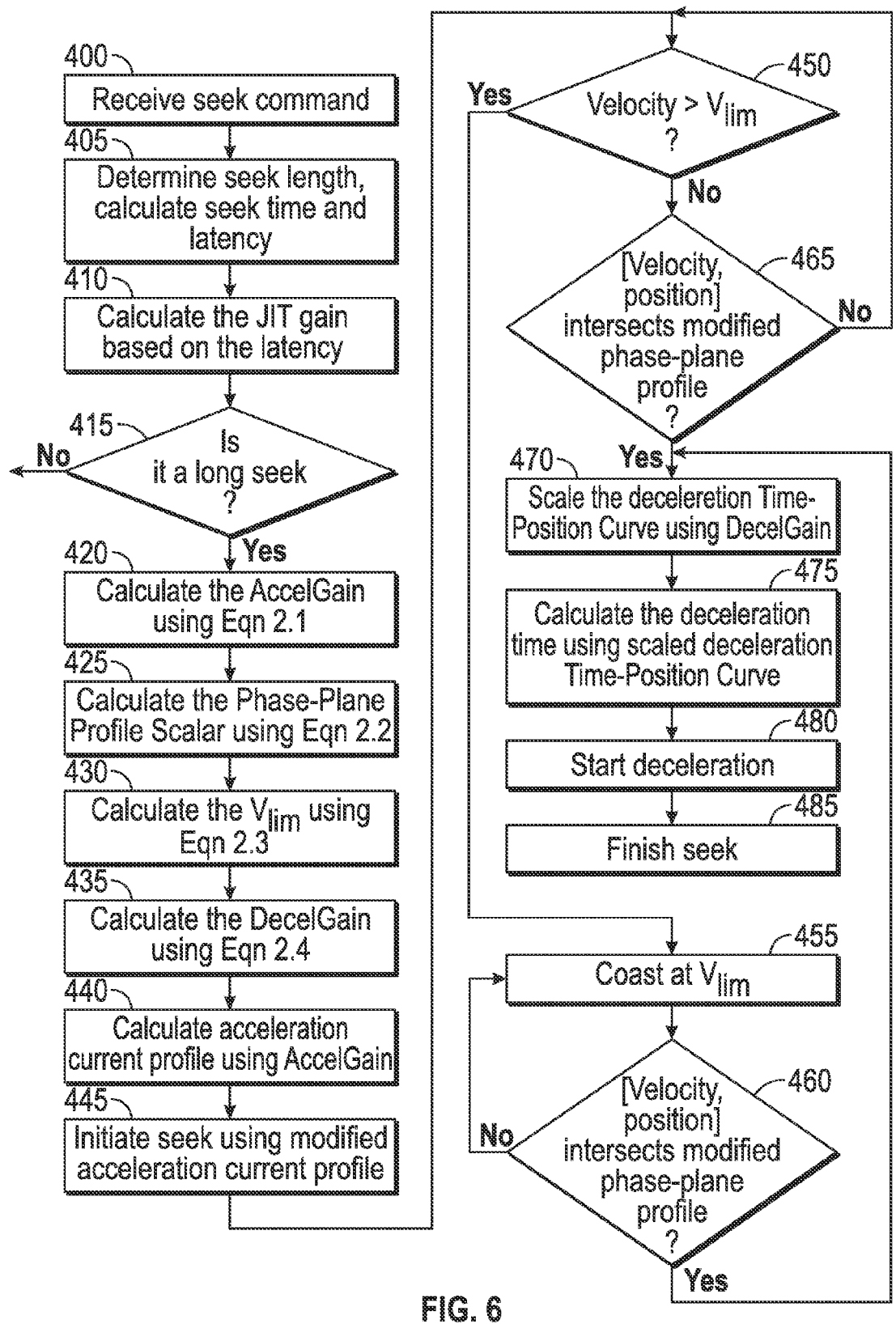
FIG. 6 is a flow chart of the JIT method according to embodiments of the invention for long seeks, i.e., seek lengths greater than some predetermined value, for example 15K tracks.

FIG. 6 is a flow chart of the improved JIT method for long seeks according to embodiments of the invention. Blocks 400-415 are identical to blocks 200-215 of FIG. 2.

In block 420, AccelGain is calculated according to the following equation:

$$AccelGain = ((1.0 - AccelGainMin)/JITGainMax) * JITGain + AccelGainMin \qquad \text{Eq. 2.1}$$

where AccelGainMin is a predetermined value less than 1.0, for example 0.1, and JITGainMax is the maximum value of JITGain, in this example 255. In block 425 Phase-Plane Profile Scalar is calculated according to the following equation:

$$\text{Phase-Plane Profile Scalar} = ((1.0 - \text{Phase-Plane Profile ScalarMin})/JITGainMax) * JITGain + \text{Phase-Plane Profile ScalarMin} \qquad \text{Eq. 2.2}$$

where Phase-Plane Profile ScalarMin is a predetermined value less than 1.0, for example 0.2, and JITGainMax is the maximum value of JITGain, in this example 255. In block 430 Vlim is calculated according to the following equation:

$$Vlim = \text{Phase-Plane Profile Scalar} * Vmax \qquad \text{Eq. 2.3}$$

In block 435 DecelGain is calculated according to the following equation:

$$DecelGain = 1/\text{Phase-Plane Profile Scalar} \qquad \text{Eq. 2.4}$$

Figure 7:
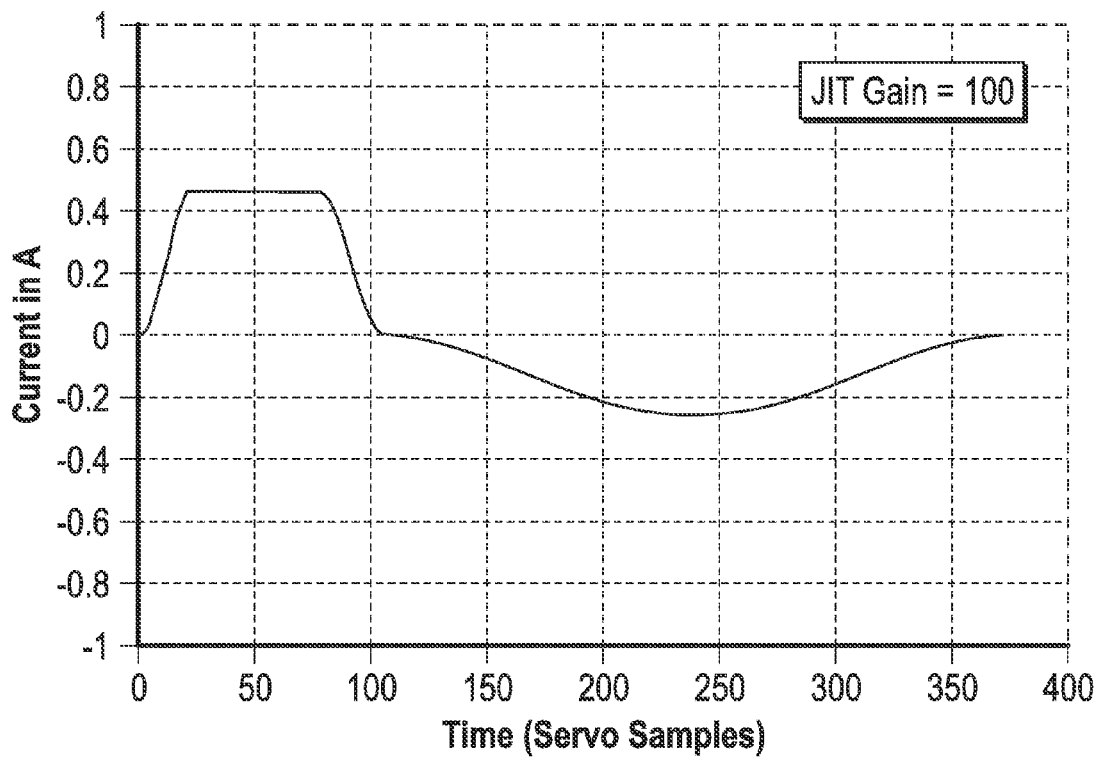
FIG. 7 is a graph of actuator current as a function of time (measured in number of servo sector samples) for a long seek with a JIT gain of 100 according to embodiments of the invention.

Next, in block 440, the predetermined acceleration current profile is recalled and modified by multiplying it by AccelGain to create a modified acceleration current profile. Then at block 445, the seek is initiated by use of the modified acceleration current profile. At decision block 450, the velocity of the transducer is compared to Vlim as the seek progresses. As the velocity increases, it may exceed Vlim, at which point the actuator current is reduced to zero and the transducer "coasts" with velocity Vlim (block 455). FIG. 7 is a graph of actuator current as a function of time (measured in number of servo sector samples) for a long seek with a JIT gain of 100 using the JIT method according to embodiments of this invention. The modified acceleration current profile is applied between samples 0 to about 100, where the actuator current is positive. Between samples 100 to about 120, the actuator current is 0 and the transducer is coasting at Vlim. FIG. 7 shows that the maximum actuator acceleration current is only about 0.42 A as compared to about 1.0 A for the prior art JIT method of FIG. 3.

Figure 8:
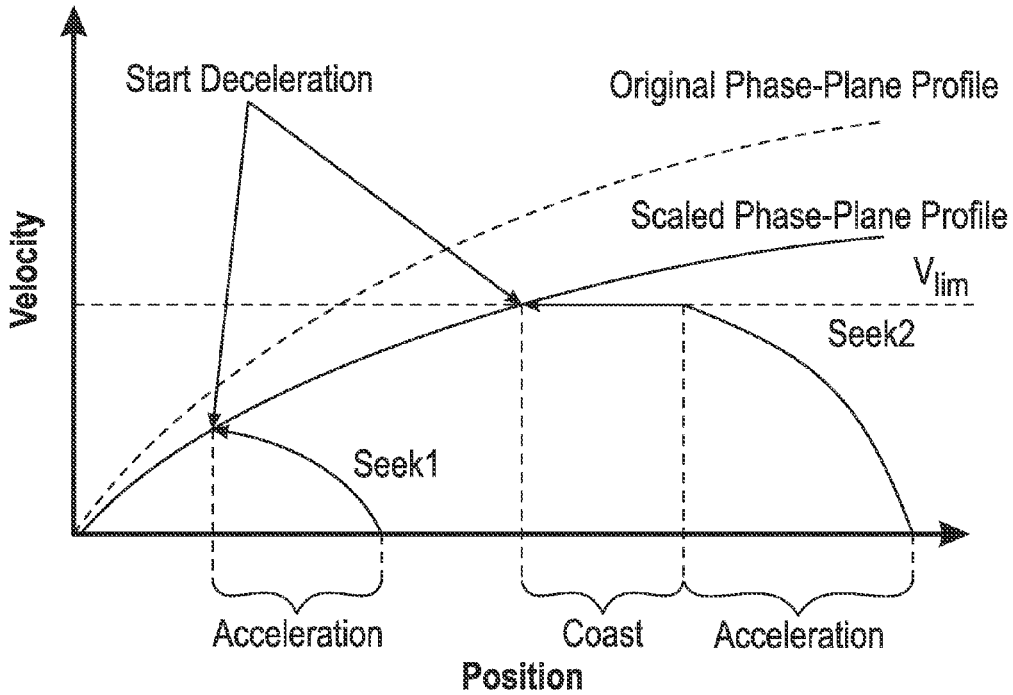
FIG. 8 is a graph showing the change in transducer position and velocity until the position and velocity intersect the scaled Phase-Plane Profile for two different seeks, one of which has a velocity limit, for the JIT method according to embodiments of the invention.

At block 460 or 465, during the seek the position and velocity of the transducer are compared to the modified velocity-position phase-plane curve (Phase-Plane Profile). The scaled or modified Phase-Plane Profile is obtained by multiplying the original Phase-Plane Profile by Phase-Plane Profile Scalar calculated in Eq. 2.2. FIG. 8 is an example showing the change in transducer position and velocity until the position and velocity intersect the scaled Phase-Plane Profile for two different seeks, one of which has a velocity limit. When the actual position and velocity intersects the modified Phase-Plane Profile, this indicates the start of deceleration (the application of negative actuator current) (YES at block 465 or 465). The predetermined deceleration Time-Position Curve is then scaled or modified by multiplying it by DecelGain (1/Phase-Plane Profile Scalar) from Eq. 2.4 (block 470), and then the deceleration time is calculated using the position and the scaled deceleration Time-Position Curve (block 475). The deceleration is initiated (block 480) and continues until the target track is reached (block 485). Referring to FIG. 7, the deceleration time is between samples 120 to about 350. FIG. 7 shows that the maximum actuator deceleration current is only about 0.25 A as compared to about 1.0 A for the prior art JIT method of FIG. 3. Also, the total seek time is increased from about 290 servo samples in FIG. 3 to about 350 samples in FIG. 7, indicating that more of the available rotational latency has been used in the JIT method according to embodiments of the invention.

Figure 9A:
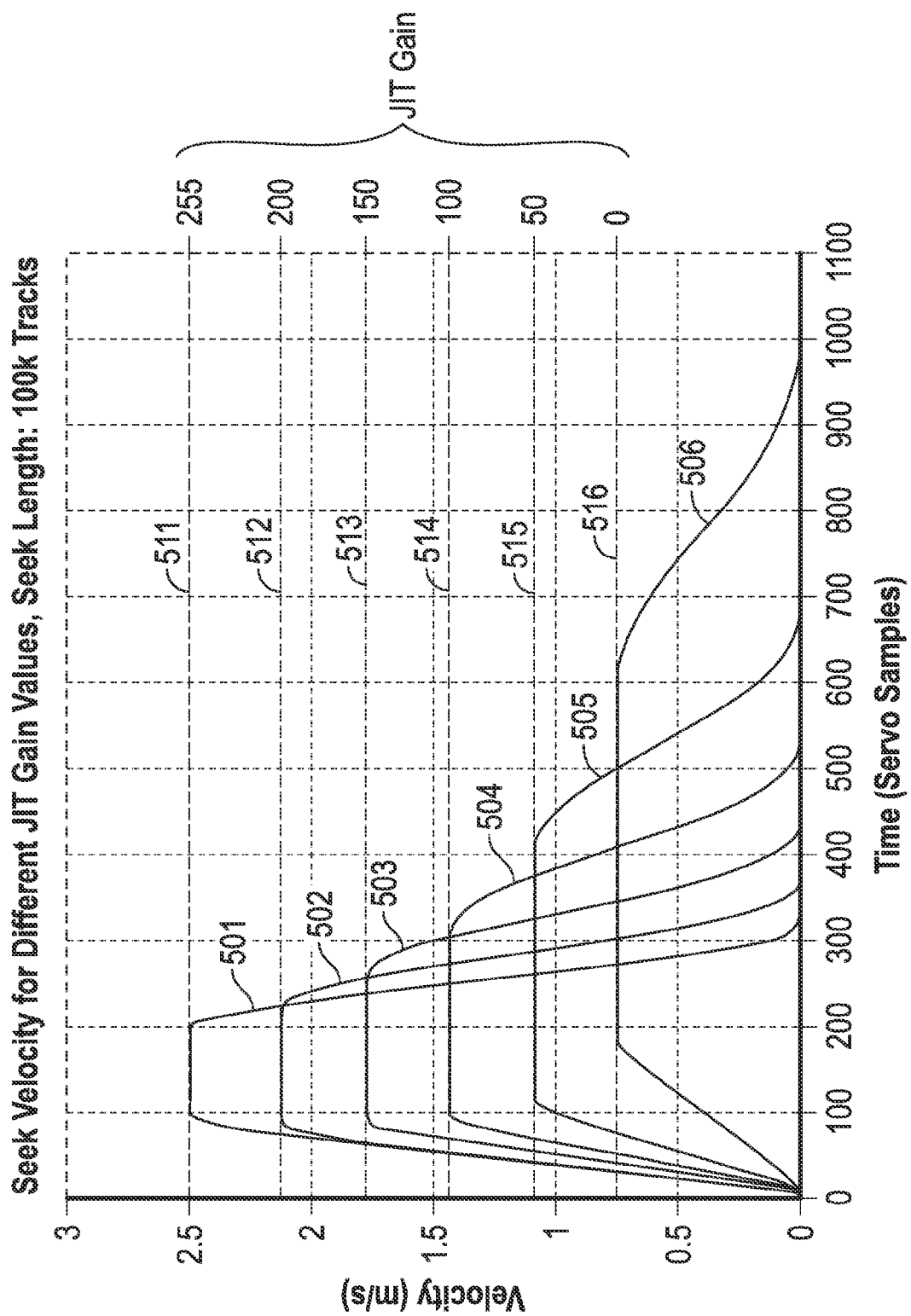
FIG. 9A is a graph of transducer velocities as a function of time for various values of JIT gain for a seek length of 100K tracks using the JIT method according to embodiments of the invention.

FIG. 9A is a graph of transducer velocities as a function of time for various values of JIT gain for a seek length of 100K tracks using the JIT method according to embodiments of the invention. The solid lines 501-506 are the seek velocity profiles and the corresponding dashed lines 511-516 are the corresponding values of Vlim calculated from Eq. 1.1. FIG. 9A shows that for the same levels of JIT gain values as in the prior art method of FIG. 5A, the method according to embodiments of the invention result in longer seek times. For example, for a JIT gain of 0 (corresponding to a rotational latency of 1 disk revolution), the seek time is about 1000 servo samples, compared to about 800 servo samples for the prior art method shown in FIG. 5A.

Figure 9B:
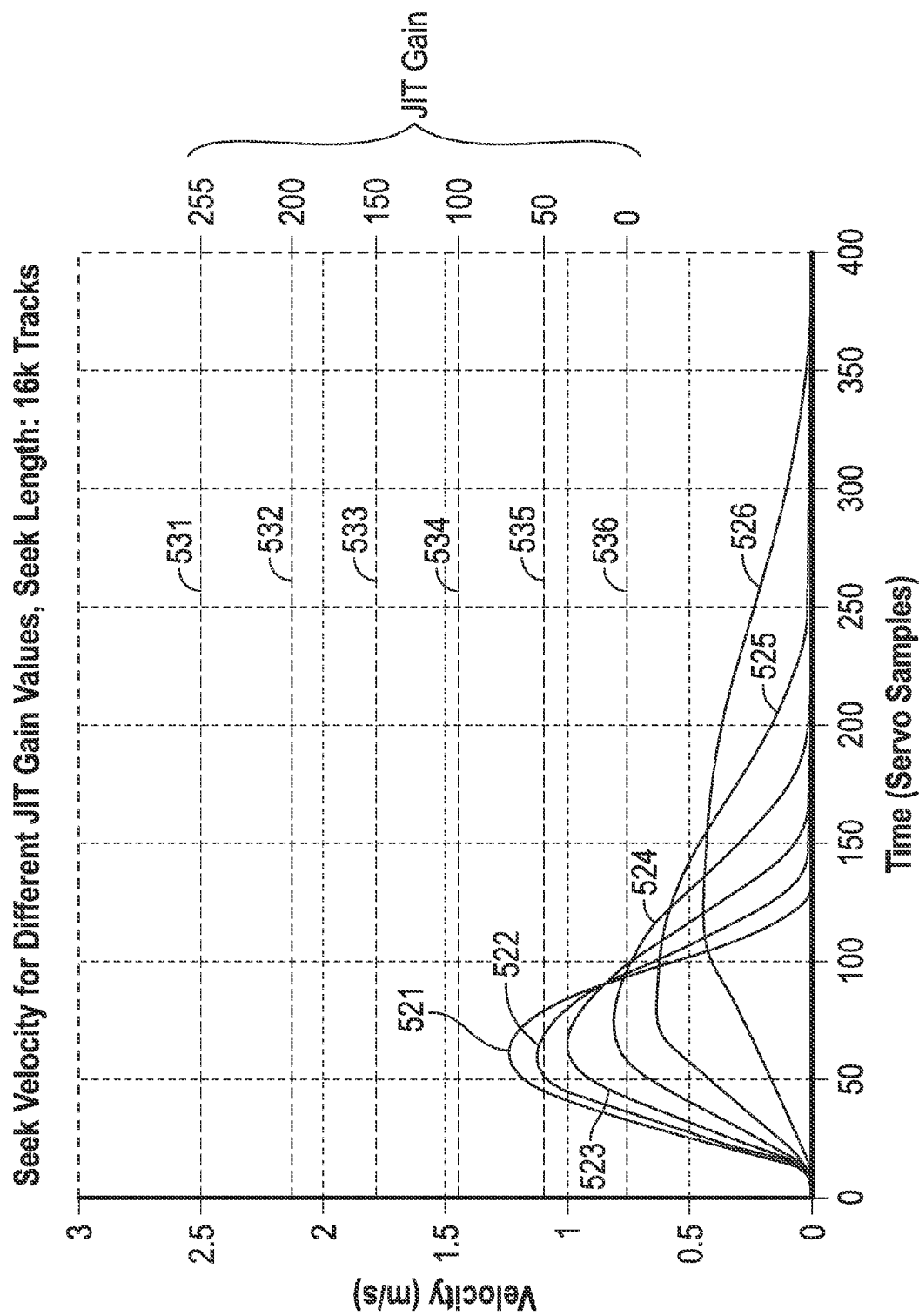
FIG. 9B is a graph of transducer velocities as a function of time for various values of JIT gain for a seek length of 16K tracks using the JIT method according to embodiments of the invention.

FIG. 9B is a graph like FIG. 9A but for a seek length of only 16K tracks. The solid lines 521-526 are the seek velocity profiles and the corresponding dashed lines 531-536 are the corresponding values of Vlim calculated from Eq. 1.1. Unlike the prior art JIT method of FIG. 5B, all JIT gain levels are affecting the seek times. This is an advantage of the improved JIT method which makes JIT much more effective on shorter long seeks. With JIT gain 0 (slowest seek) using the prior art JIT method, the seek time is about 170 servo samples, whereas with the JIT method according to embodiments of the invention the seek time is much slower at about 350 servo samples.

Figure 10A:
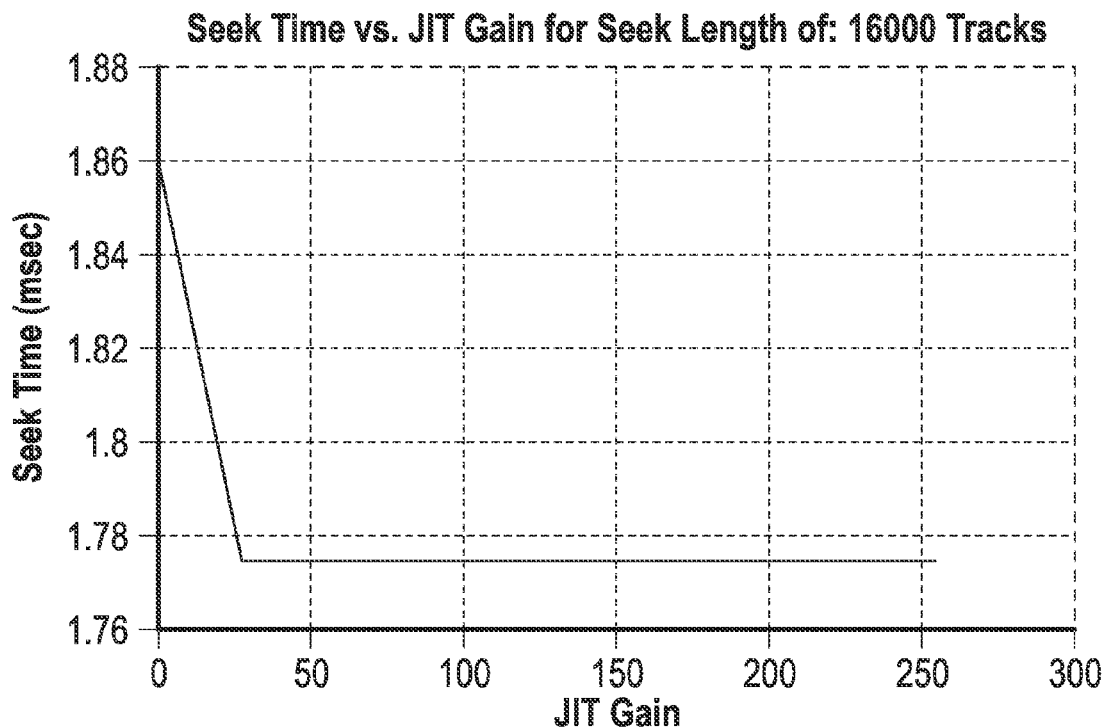
FIG. 10A is a graph of seek time as function of JIT gain for a seek length of 16K tracks for the prior art JIT method.
Figure 10B:
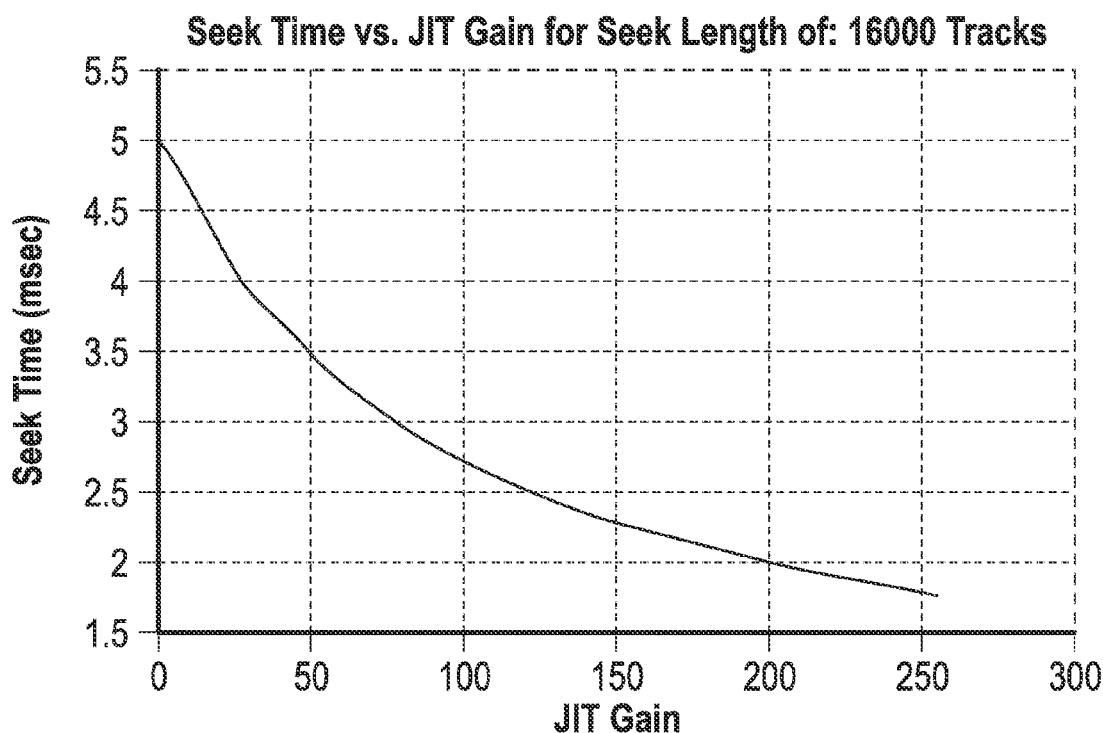
FIG. 10B is a graph of seek time as function of JIT gain for a seek length of 16K tracks for the JIT method according to embodiments of the invention.

A monotonic relationship between JIT gain values and seek times is desirable. FIG. 10A is a graph of seek time as function of JIT gain for a seek length of 16K tracks for the prior art method, and FIG. 10B is the same graph for the JIT method according to embodiments of the invention. FIG. 10B shows this monotonic relationship for all seek times, while FIG. 10A shows it only for small JIT gain values.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. In a hard disk drive, an improvement comprising:
 a rotatable disk having a plurality of data tracks containing data sectors;
 a transducer for accessing the data sectors;
 an actuator for moving the transducer to seek from one track to another track, wherein the actuator cannot move the transducer faster than a predetermined maximum velocity (Vmax); and
 a servo control system coupled to the actuator and responsive to a seek command, the servo control system configured to:
  calculate track seek length, rotational latency of a target sector, and a just-in-time (JIT) gain (JITGain) from the calculated rotational latency, the JITGain being inversely proportional to the rotational latency,
  calculate an initial transducer velocity limit (Vlim) from the JITGain,
  generate a seek profile comprising a transducer acceleration phase, a transducer coast phase at Vlim and a transducer deceleration phase,
  apply an acceleration current to the actuator,
  determine when the transducer velocity and position intersects a predetermined velocity-position phase-plane curve (Phase-Plane Profile), and
  in response to said Phase-Plane Profile intersection, apply a deceleration current to the actuator;
 an improvement comprising wherein the servo control system, for seek lengths greater than a predetermined value, is configured to:
  modify the acceleration current with an acceleration gain (AccelGain), the AccelGain being a function of JITGain,
  modify the Phase-Plane Profile with a Phase-Plane Profile gain (Phase-Plane Profile Scalar), the Phase-Plane Profile Scalar being a function of JITGain,
  calculate a reduced Vlim less than said initial Vlim as a function of Phase-Plane Profile Scalar and Vmax, and
  modify the deceleration current with a deceleration gain (DecelGain), the DecelGain being a function of Phase-Plane Profile Scalar.

2. The improvement according to claim 1 wherein the servo control system is configured to calculate AccelGain according to the following:

AccelGain=((1.0−AccelGainMin)/JITGainMax)*JITGain+AccelGainMin, where AccelGainMin is a predetermined value less than 1.0.

3. The improvement according to claim 1 wherein the servo control system is configured to calculate Phase-Plane Profile Scalar according to the following:

Phase-Plane Profile Scalar=((1.0−Phase-Plane Profile ScalarMin)/JITGainMax)*JITGain+Phase-Plane Profile ScalarMin, where Phase-Plane Profile ScalarMin is a predetermined value less than 1.0.

4. The improvement according to claim 1 wherein the servo control system is configured to calculate said reduced Vlim equal to Phase-Plane Profile Scalar*Vmax.

5. The improvement according to claim 1 wherein the servo control system is configured to calculate DecelGain equal to 1/Phase-Plane Profile Scalar.

6. A hard disk drive comprising:
 a rotatable disk having a plurality of data tracks containing data sectors;
 a transducer for accessing the data sectors;
 an actuator for moving the transducer to seek from one track to another track; and
 a servo controller coupled to the actuator and responsive to a seek command to move the transducer to a target sector in a target track, the controller being capable of performing just-in-time (JIT) seeks by calculation of rotational latency of target sectors from the seek commands, increasing the velocity of the transducer according to a predetermined acceleration, limiting the transducer velocity to coast at a velocity limit for seeks longer than a predetermined seek length, and decreasing the velocity of the transducer according to a predetermined deceleration, wherein the controller, for a seek greater than a predetermined seek length, is configured to:
 generate a JIT gain (JITGain) from the calculated rotational latency, the JITGain being inversely proportional to the calculated rotational latency,
 modify the transducer acceleration and deceleration using the JITGain,
 reduce the transducer velocity limit using the JITGain,
 apply positive current to the actuator to move the transducer with the JITGain-modified acceleration until the transducer reaches the reduced velocity limit, determine when to initiate deceleration of the transducer, and apply negative current to the actuator to move the transducer with the JITGain-modified deceleration until the transducer reaches the target track.

7. The disk drive of claim 6 wherein the controller is configured to modify the acceleration with an acceleration gain (AccelGain) and to calculate AccelGain according to the following:

$$AccelGain=((1.0-AccelGainMin)/JITGainMax)*JITGain+AccelGainMin,$$

where AccelGainMin is a predetermined value less than 1.0.

8. The disk drive of claim 6 wherein the controller is configured to access a velocity-position phase plane curve (Phase-Plane Profile), to modify the Phase-Plane Profile with a Phase-Plane Profile gain (Phase-Plane Profile Scalar), and to calculate Phase-Plane Profile Scalar according to the following:

$$Phase\text{-}Plane\ Profile\ Scalar=((1.0-Phase\text{-}Plane\ Profile\ ScalarMin)/JITGainMax)*JITGain+Phase\text{-}Plane\ Profile\ ScalarMin,$$

where Phase-Plane Profile ScalarMin is a predetermined value less than 1.0.

9. The disk drive of claim 8 wherein the actuator cannot move the transducer faster than a predetermined maximum velocity (Vmax), and wherein the controller is configured to reduce the limiting velocity by calculation of said reduced velocity limit (Vlim) equal to Phase-Plane Profile Scalar*Vmax.

10. The disk drive of claim 8 wherein the controller is configured to modify the deceleration by multiplying it by a deceleration gain (DecelGain) and to calculate DecelGain equal to 1/Phase-Plane Profile Scalar.

* * * * *